May 7, 1957 C. HARDEN 2,791,253
FEEDER FOR CITRUS JUICE EXTRACTING MACHINES
Filed May 3, 1954 2 Sheets-Sheet 1

CARL HARDEN
INVENTOR.

BY *Lyon & Lyon*

ATTORNEYS

May 7, 1957 C. HARDEN 2,791,253
FEEDER FOR CITRUS JUICE EXTRACTING MACHINES
Filed May 3, 1954 2 Sheets-Sheet 2

CARL HARDEN
INVENTOR.

BY
ATTORNEYS

United States Patent Office 2,791,253
Patented May 7, 1957

2,791,253

FEEDER FOR CITRUS JUICE EXTRACTING MACHINES

Carl Harden, Pasadena, Calif., assignor to Brown Citrus Machinery Corporation, Whittier, Calif., a corporation of California Application May 3, 1954, Serial No. 427,108

12 Claims. (Cl. 146—3)

This invention relates to apparatus for extracting juice from citrus fruit and the like and has particular reference to a device for feeding citrus fruit to juice extracting machines of the type designed to operate upon halved fruit.

One of the principal objects of this invention is to provide novel and improved apparatus for cutting citrus fruit into halves and feeding the cut halves to a juice extracting apparatus.

Another object of this invention is to provide a citrus fruit halving and feeding apparatus which is capable of operating upon large volumes of fruit in a given time period.

Another object of this invention is to provide a feeder for citrus juice extracting machines which is adapted for positive feed of fruit halves, thus permitting ready synchronism with the operating machine members of the extractors.

Another object of this invention is to provide a citrus fruit halving and feeding apparatus which is extremely simple in construction, yet highly effective in operation and adapted to be economically manufactured on a quantity basis.

Other objects and advantages of this invention it is believed will be readily apparent from the following detailed description of a preferred embodiment thereof when read in connection with the accompanying drawings.

Figure 1:
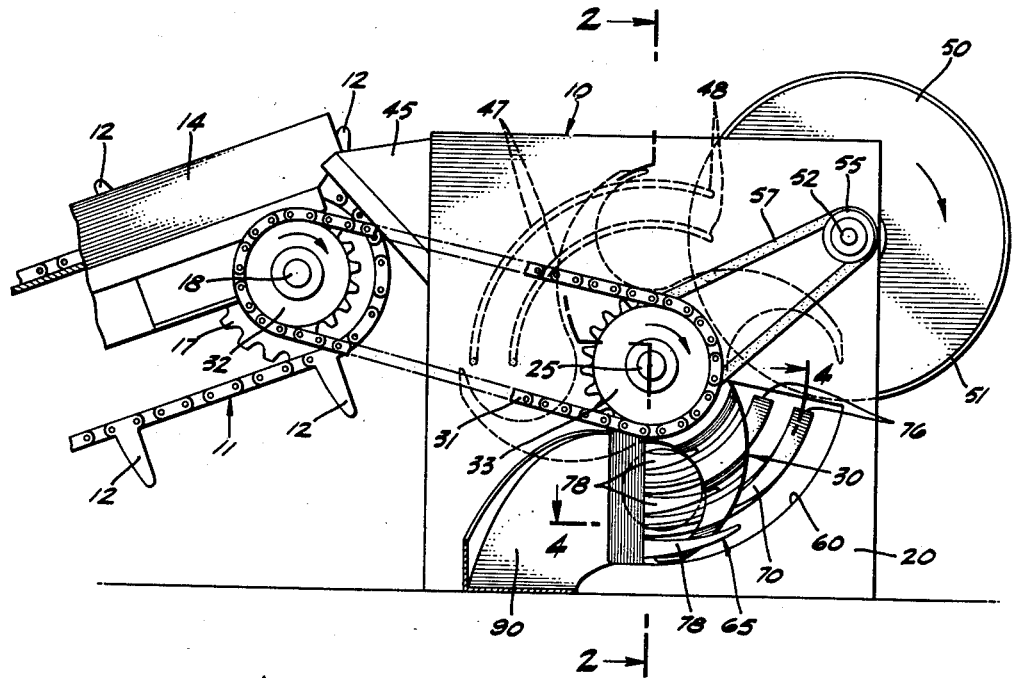
Figure 1 is a side elevation of a device embodying a preferred form of the invention.
Figure 2:
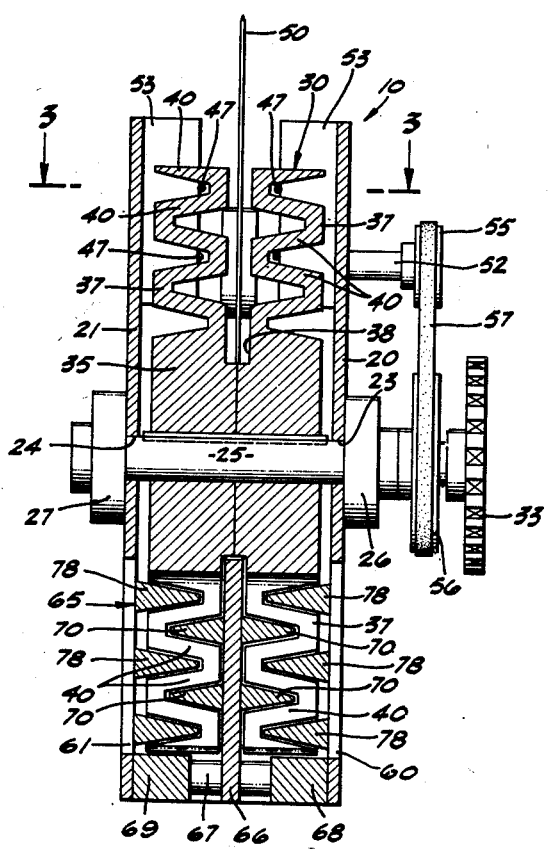
Figure 2 is an enlarged sectional view taken substantially on the line 2—2 of Figure 1.

Referring now to the drawings, the device of the invention is generally indicated 10 and preferably includes an endless chain conveyor 11 provided with projecting fingers 12 which convey individual fruit on the upper run of the chain between stationary guide plates 14, one on either side of said upper run. The endless chain conveyor 11 extends between an upper sprocket 17 carried on a shaft 18 and a lower sprocket (not shown), and is suitably driven by power means (not shown).

The feeding and cutting device 10 proper includes a pair of spaced, parallel side plates 20 and 21, rigidly connected together by suitable means (not shown). Extending between the side plates and through apertures 23 and 24 therein is a shaft 25 suitably journaled in bearing members 26 and 27 secured to the respective side plates 20 and 21. Keyed to the shaft 25 is the cup wheel feeder member 30, described more fully below. The shaft 25 and member 30 are driven in synchronism with the conveyor 11 by means of the chain transmission 31 extending between a sprocket 32 on the shaft 18 and a sprocket 33 carried on the end of the shaft 25.

As shown in the drawings, the cup wheel feeder member is formed of two identical halves and is provided with a central hub portion 35 which is keyed to the shaft 25. Extending outwardly from the hub portion is a plurality of cup members 37 in which, as shown best in Figure 1, the leading edges thereof are concavely curved when viewed in side elevation. The cup member halves are spaced to provide a central radial slot 38 in each cup member. In order to permit cooperation with the diverter baffle member, described more fully below, the cup member halves are of undulating structure, providing a plurality of finger members 40.

Figure 3:
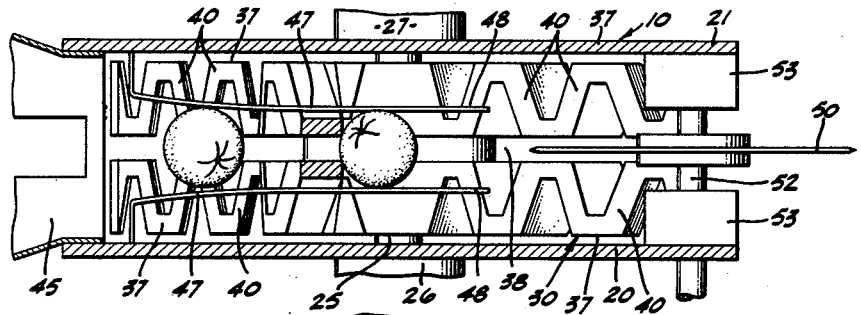
Figure 3 is a sectional view taken substantially on the line 3—3 of Figure 2.

A delivery chute 45 is provided between the side plates 20 and 21 adjacent the upper, discharge end of the conveyor 11, cooperating therewith to transfer whole citrus fruit from the conveyor to the cup wheel feeder member 30. A pair of wire guide members 47 are secured at one end to each of the side plates. As shown in Figures 1 and 3, both pairs of the wire guide members are spaced an equal distance from the respective side plates, their ends 48 being free so that the members may spring outwardly to accommodate fruit of large size.

Means are provided for halving the whole fruit carried by the cup wheel feeder member and, as shown in the drawings, these means may include the disk-shaped rotary blade 50 having a sharpened peripheral edge 51, the blade being carried on a cross shaft 52 journaled in bearings 53 secured to the inner faces of the side plates 20 and 21. One end of the shaft 52 extends through the side plate 20 and carries a pulley 55. A relatively larger pulley 56 is carried on the feeder member shaft 25, and extending between the pulleys is a V-belt 57 providing a driving connection between the shafts 25 and 52. From an inspection of the drawings it will be apparent that the blade 50 extends into the slot 38 of each cup member 37 as the members are rotated past the blade.

Figure 4:
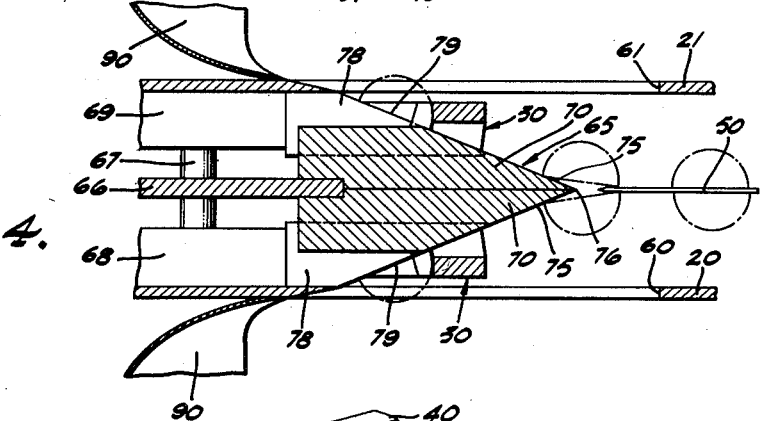
Figure 4 is an enlarged sectional view taken substantially on the line 4—4 of Figure 1.
Figure 5:
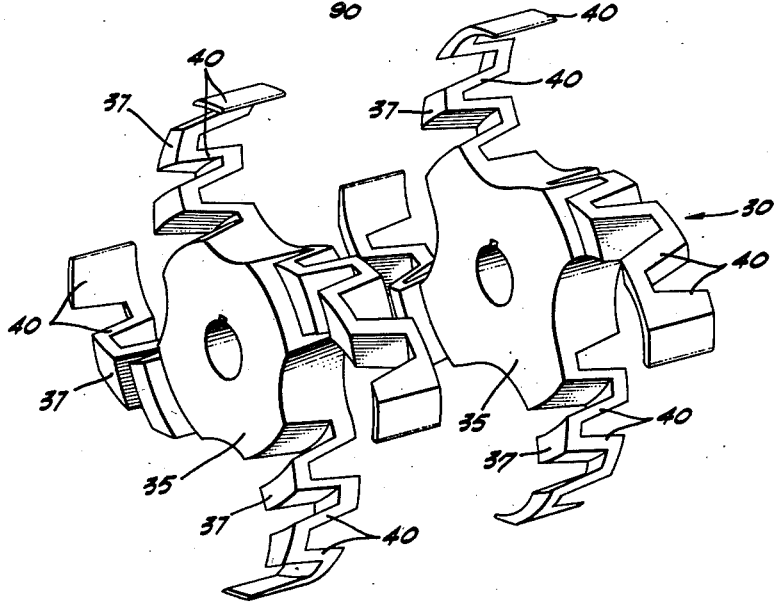
Figure 5 is a perspective view of the cup wheel feeder member, with the two halves thereof separated for clarity of illustration.

Immediately below the level of the blade 50, the side plates 20 and 21 are each provided with fruit discharge openings 60 and 61, respectively. Extending to said openings from a point intermediate said side plates is a fruit half diverter member generally indicated 65. This member includes a central arm 66 secured to a crossbar 67 extending between blocks 68 and 69 secured to the lower portions of the side plates 20 and 21, respectively. Finger members 70 extend outwardly from each side of the central arm and are of a size and shape to fit into alternate spaces between adjacent finger members 40 of the respective cup members 37, adequate clearance between the finger members 40 and 70 being provided to avoid interference therebetween. As shown best in Figure 4, each of the finger members is provided with an inclined face 75, the faces meeting to form relatively sharp edges 76 adjacent the underside of the knife blade. The structure of the diverter member 65 is completed by finger members 78 which extend inwardly from each of the side plates 20 and 21 to fit in the remaining spaces between adjacent finger members 40. It will be noted from an inspection of Figure 4 that the forward faces 79 of the finger members 78, while staggered with respect to the finger members 78, are inclined in the same manner as, and form continuation of, the faces 75.

The rear end portions of the faces 79 of the finger members 78 meet diverter plates 90, one extending outwardly from each of the side plates 20 and 21. As shown in Figure 1, the divider plates curve outwardly and downwardly from a vertical plane to a horizontal plane.

In operation of the device described above, whole fruit is delivered to the chute 45 by means of the conveyor 11, the individual fruit being picked up by the rotating cup members 30 and centered therein by the wire guide members 47. As the cup members rotate they present the whole fruit to the spinning blade 50, whereupon each fruit is halved, still being held in its cup by centrifugal force and the sliding friction of the halves across the blade. Continued rotation of the cup presents the halved fruit to the diverter member 65, the edges 76 of the finger members 70 entering the space between the cut faces of the fruit, whereupon the two fruit halves are moved across the respective faces 75 and 79 to opposite sides of the machine, being released from the cup member. The halves slide smoothly from the finger members 78 out the diverter plates 90 and thence thereacross to be placed into position, cut face downward, to be picked up by an appropriate member of a juice extracting machine (not shown). It will be understood by those skilled in the art that the shape of the diverter plates may be varied from that shown in order to deliver the fruit halves to subsequent machine members in any desired position.

While a specific embodiment of this invention has been shown and described, it is not intended to limit the same to the exact details of the construction set forth, and it embraces such changes, modifications and equivalents of the parts and their formation and arrangement as come within the purview of the appended claims.

I claim:

1. In apparatus for feeding and halving citrus fruit, a frame, a rotatable member mounted on said frame and having a plurality of cup members thereon, each of said cup members including a plurality of first finger members having spaces therebetween, means cooperating with said rotatable member for delivering individual whole citrus fruit to said cups, means operably associated with said rotatable member for halving fruit carried in said cups, and a diverter member mounted on said frame for separating the cut halves, said diverter member including a plurality of second finger members positioned and shaped to enter the spaces between said first finger members whereby fruit halves are transferred from said cup members to said diverter member.

2. In apparatus for feeding and halving citrus fruit, a frame, a rotatable member mounted on said frame and having a plurality of cup members thereon, each of said cup members including a plurality of first finger members having spaces therebetween, means cooperating with said rotatable member for delivering individual whole citrus fruit to said cups, means operably associated with said rotatable member for halving fruit carried in said cups, and a diverter member mounted on said frame for separating the cut halves, said diverter member including a plurality of second finger members positioned and shaped to enter the spaces between said first finger members, each of said second finger members having inclined faces terminating in a relatively sharp edge adapted to separate cut fruit halves, whereby fruit halves are transferred from said cup members to said diverter member.

3. In apparatus for feeding and halving citrus fruit, a frame, a wheel mounted on said frame for rotation about a horizontal axis, said wheel having a plurality of cup members thereon, each of said cup members including a plurality of first finger members having spaces therebetween, means cooperating with said wheel for delivering individual whole citrus fruit to said cups, means operably associated with said rotatable member for halving fruit carried in said cups, and a diverter member mounted on said frame for separating the cut halves, said diverter member including a plurality of second finger members positioned and shaped to enter the spaces between said first finger members whereby fruit halves are transferred from said cup members to said diverter member.

4. In apparatus for feeding and halving citrus fruit, a frame, a wheel mounted on said frame for rotation about a horizontal axis, said wheel having a plurality of cup members thereon, each of said cup members including a plurality of first finger members having spaces therebetween, means cooperating with said wheel for delivering individual whole citrus fruit to said cups, means operably associated with said rotatable member for halving fruit carried in said cups, and a diverter member mounted on said frame for separating the cut halves, said diverter member including a plurality of second finger members positioned and shaped to enter the spaces between said first finger members, each of said second finger members having inclined faces terminating in a relatively sharp edge adapted to separate cut fruit halves, whereby fruit halves are transferred from said cup members to said diverter member.

5. In apparatus for feeding and halving citrus fruit, a frame, a rotatable member mounted on said frame and having a plurality of cup members thereon, each of said cup members including a plurality of first finger members having spaces therebetween and each of said cups having a radial slot therein, means cooperating with said rotatable member for delivering individual whole citrus fruit to said cups, a knife blade mounted on said frame, said knife having a portion adapted to be received in said radial slots to halve fruit carried by said cup members, and a diverter member mounted on said frame for separating the cut halves, said diverter member including a plurality of second finger members positioned and shaped to enter the spaces between said first finger members whereby fruit halves are transferred from said cup members to said diverter member.

6. In apparatus for feeding and halving citrus fruit, a frame, a wheel mounted on said frame for rotation about a horizontal axis, said wheel having a plurality of cup members thereon, each of said cup members including a plurality of first finger members having spaces therebetween and each of said cups having a radial slot therein, means cooperating with said wheel for delivering individual whole citrus fruit to said cups, a knife blade mounted on said frame, said knife having a portion adapted to be received in said radial slots to halve fruit carried by said cup members, and a diverter member mounted on said frame for separating the cut halves, said diverter member including a plurality of second finger members positioned and shaped to enter the spaces between said first finger members whereby fruit halves are transferred from said cup members to said diverter member.

7. In apparatus for feeding and halving citrus fruit, a frame, a wheel mounted on said frame for rotation about a horizontal axis, said wheel having a plurality of cup members thereon, each of said cup members including a plurality of first finger members having spaces therebetween and each of said cups having a radial slot therein, means cooperating with said wheel for delivering individual whole citrus fruit to said cups, a knife blade mounted on said frame, said knife blade having a portion adapted to be received in said radial slots to halve fruit carried by said cup members, and a diverter member mounted on said frame for separating the cut halves, said diverter member including a plurality of second finger members positioned and shaped to enter the spaces between said first finger members, each of said second finger members having inclined faces terminating in a relatively sharp edge adapted to separate cut fruit halves, whereby fruit halves are transferred from said cup members to said diverter member.

8. In apparatus for feeding and halving citrus fruit, a frame, a rotatable member mounted on said frame and having a plurality of cup members thereon, each of said cup members including a plurality of first finger members having spaces therebetween, means cooperating with said rotatable member for delivering individual whole citrus fruit to said cups, guide means for centering fruit in said cup members, means operably associated with said rotatable member for halving fruit carried in said cups, and a diverter member mounted on said frame for separating the cut halves, said diverter member including a plurality of second finger members positioned and shaped to enter the spaces between said first finger members whereby fruit halves are transferred from said cup members to said diverter member.

9. In apparatus for feeding and halving citrus fruit, a frame, a rotatable member mounted on said frame and having a plurality of cup members thereon, each of said cup members including a plurality of first finger members having spaces therebetween, means cooperating with said rotatable member for delivering individual whole citrus fruit to said cups, resilient wire guide means secured to said frame and cooperating with said cup members to position whole fruit in said cup members, means operably associated with said rotatable member for halving fruit carried in said cups, and a diverter member mounted on said frame for separating the cut halves, said diverter member including a plurality of second finger members positioned and shaped to enter the spaces between said first finger members whereby fruit halves are transferred from said cup members to said diverter member.

10. In apparatus for feeding and halving citrus fruit, a frame, a rotatable member mounted on said frame and having a plurality of cup members thereon, each of said cup members including a plurality of first finger members having spaces therebetween, means cooperating with said rotatable member for delivering individual whole citrus fruit to said cups, guide means for centering fruit in said cup members, means operably associated with said rotatable member for halving fruit carried in said cups, and a diverter member mounted on said frame for separating the cut halves, said diverter member including a plurality of second finger members positioned and shaped to enter the spaces between said first finger members, each of said second finger members having inclined faces terminating in a relatively sharp edge adapted to separate cut fruit halves, whereby fruit halves are transferred from said cup members to said diverter member.

11. In apparatus for feeding and halving citrus fruit, a frame, a rotatable member mounted on said frame and having a plurality of cup members thereon, each of said cup members including a plurality of first finger members having spaces therebetween, means cooperating with said rotatable member for delivering individual whole citrus fruit to said cups, resilient wire guide means secured to said frame and cooperating with said cup members to position whole fruit in said cup members, means operably associated with said rotatable member for halving fruit carried in said cups, and a diverter member mounted on said frame for separating the cut halves, said diverter member including a plurality of second finger members positioned and shaped to enter the spaces between said first finger members, each of said second finger members having inclined faces terminating in a relatively sharp edge adapted to separate cut fruit halves, whereby fruit halves are transferred from said cup members to said diverter member.

12. In apparatus for feeding and halving citrus fruit, a frame, a wheel mounted on said frame for rotation about a horizontal axis, said wheel having a plurality of cup members thereon, each of said cup members including a plurality of first finger members having spaces therebetween and each of said cups having a radial slot therein, means cooperating with said wheel for delivering individual whole citrus fruit to said cups, guide means for centering fruit in said cup members, a rotatable knife blade mounted on said frame, said knife blade having a portion adapted to be received in said radial slots to halve fruit carried by said cup members, and a diverter member mounted on said frame for separating the cut halves, said diverter member including a plurality of second finger members positioned and shaped to enter the spaces between said first finger members, each of said second finger members having inclined faces terminating in a relatively sharp edge adjacent said knife blade, said edges adapted to separate fruit halves cut by said knife blade, whereby fruit halves are transferred from said cup members to said diverter member.

References Cited in the file of this patent
UNITED STATES PATENTS

| | | |
|---|---|---|
| 917,849 | Couch | Apr. 13, 1909 |
| 1,154,765 | Harrison | Sept. 28, 1915 |
| 1,357,004 | Robbins | Oct. 26, 1920 |
| 2,205,059 | Clark | June 18, 1940 |
| 2,673,583 | Skog | Mar. 30, 1954 |